Figure 1:
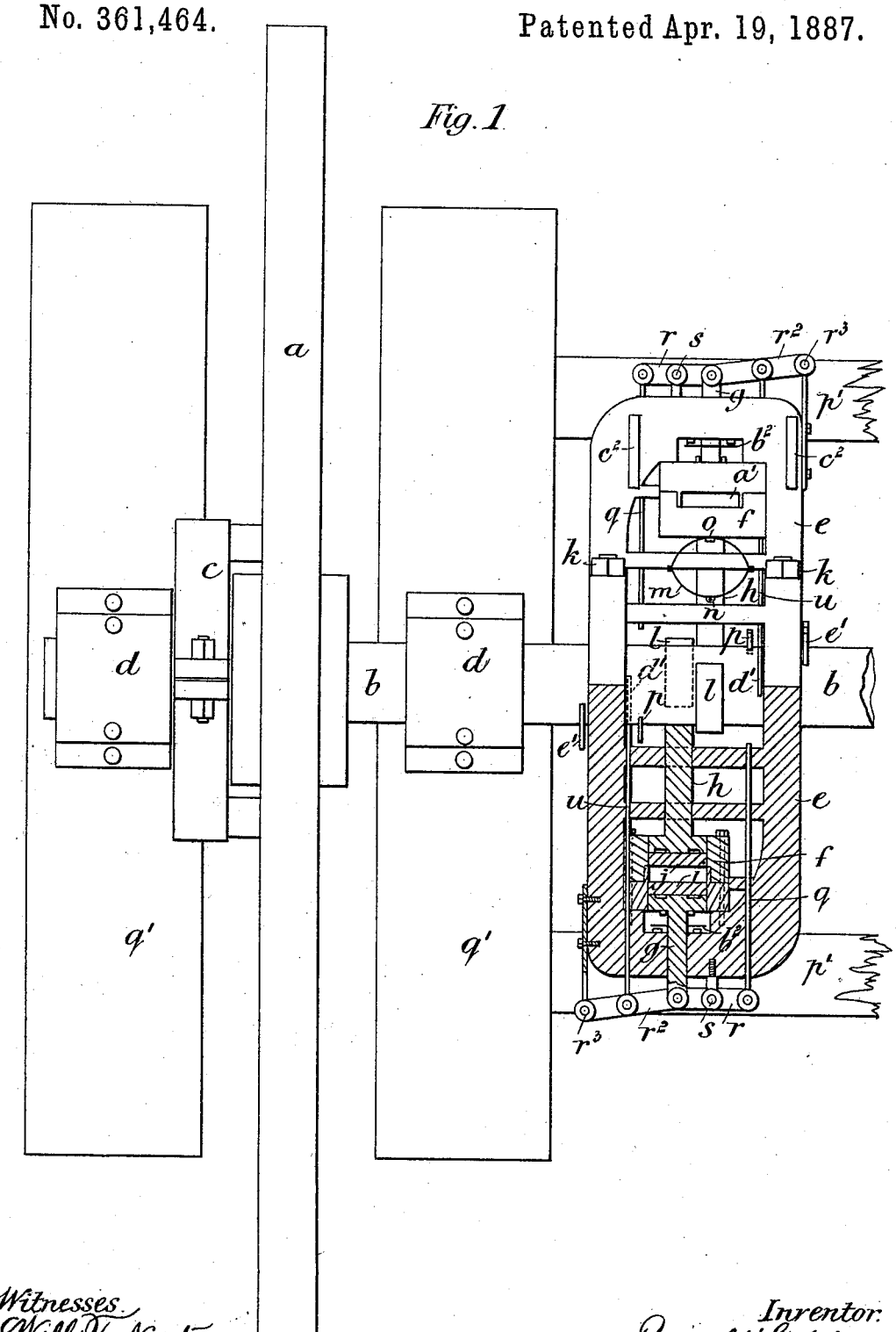

(No Model.) 2 Sheets—Sheet 1.

R. STANLEY.
MACHINE FOR PRESSING AND MOLDING BRICKS, &c.

No. 361,464. Patented Apr. 19, 1887.

Witnesses
Will T. Norton
Henry G. Dieterich

Inventor:
Reginald Stanley
By John J. Halsted & Son
his Attys (No Model.) 2 Sheets—Sheet 2.
R. STANLEY.
MACHINE FOR PRESSING AND MOLDING BRICKS, &c.
No. 361,464. Patented Apr. 19, 1887.
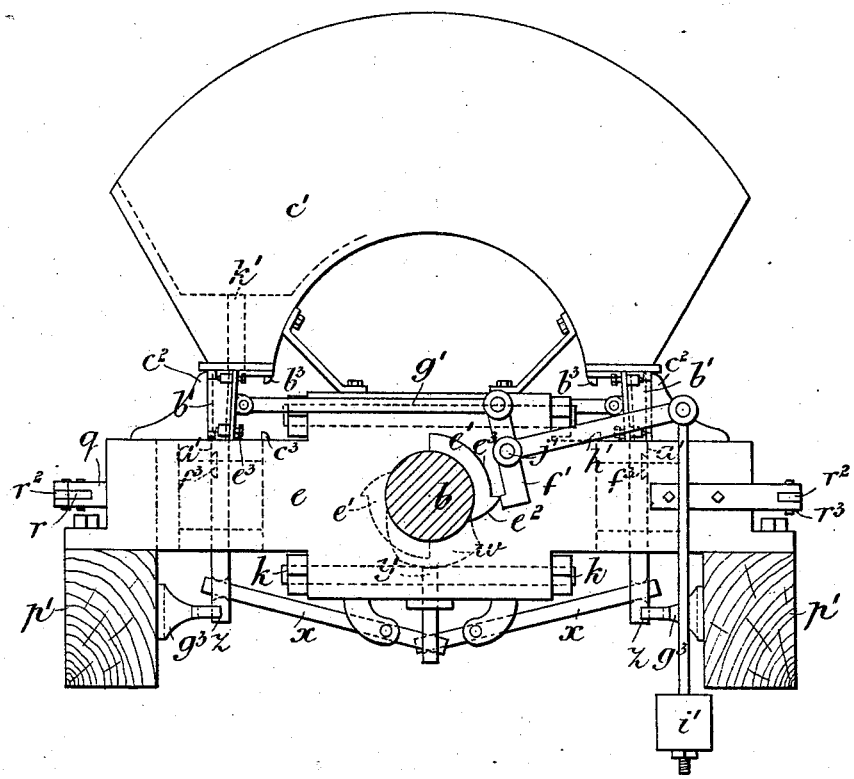
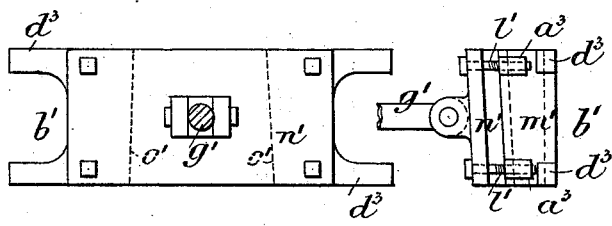
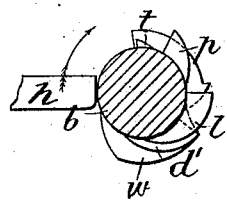

UNITED STATES PATENT OFFICE.

REGINALD STANLEY, OF NUNEATON, COUNTY OF WARWICK, ENGLAND.

MACHINE FOR PRESSING AND MOLDING BRICKS, &c.

SPECIFICATION forming part of Letters Patent No. 361,464, dated April 19, 1887.

Application filed April 27, 1886. Serial No. 200,306. (No model.) Patented in England July 14, 1885, No. 8,508, and in France April 17, 1886, No. 175,551.

*To all whom it may concern:*

Be it known that I, REGINALD STANLEY, a subject of the Queen of Great Britain, residing at Nuneaton, in the county of Warwick, England, have invented new and useful Improvements in Machinery for Pressing and Molding Bricks, Tiles, and the Like, (for which I have obtained patents in the following countries, viz: Great Britain, dated July 14, 1885, No. 8,508, and in France, dated April 17, 1886, No. 175,551,) of which the following is a specification.

My invention relates to improvements in the construction of machinery or apparatus to be worked by manual, horse, steam, or other power for making, pressing, and delivering bricks, tiles, blocks for fuel, and other articles made of loam, clay, marl, sand, fine coal or slack, or other materials, in a dry, powdered, granulated, moist, or plastic state.

In order to enable my invention to be fully understood, I will describe the same by reference to the accompanying drawings, in which—

Figure 1 represents a plan, partly in section, of a machine for pressing and molding bricks, tiles, and the like constructed according to my invention. Fig. 2 is an end elevation of the same, the shaft and the beams for supporting the machine being shown in section. Figs. 3, 4, and 5 are detached views of parts of the machine. Figs. 1, 2, and 3 are drawn to a scale of about one inch to a foot, and Fig. 4 about two inches to a foot.

Similar letters in all the figures represent similar parts.

For the purpose of my invention I employ a heavy fly-wheel, $a$, of large diameter, placed or fixed on a horizontal shaft, $b$, either directly, by means of a key or keys, or otherwise, or indirectly, as shown in Fig. 1, by means of and working in connection with a friction-clutch, $c$, the core of which is fixed or keyed to the shaft $b$. The shaft $b$ is carried on and works in two bearings, $d$, one on each side of the fly-wheel $a$. The shaft $b$ extends on either side of the fly-wheel $a$ and beyond the bearings $d$ to the required distance, and another bearing or bearings can be placed at an interval or intervals, as required.

On each side of the shaft $b$ (or one side only thereof) and on one side (or both sides) of the fly-wheel $a$, I fix in a horizontal position a box or frame, $e$, containing an interior box, $f$, plungers $g$ and $h$, having molding plates or surfaces $i$ and $j$, respectively, and rods, hereinafter described, all of which can be renewed as required. When, as shown in the drawings, more than one of the said boxes or frames $e$ is employed, I cast or couple them by means of threaded pins or bolts and nuts $k$, or otherwise, opposite one another on either side of the shaft $b$, the shaft running immediately between them, so that the pressure applied to the box or frame $e$ on one side is counterbalanced by the pressure applied to the box or frame $e$ on the other side, thereby avoiding, as much as possible, friction to the shaft $b$ and boxes or frames $e$ $e$.

The required pressure and action are effected by means of cams or eccentrics, hereinafter described, attached to the shaft immediately between and just outside the boxes or frames, so that when the shaft $b$ revolves, the cams or eccentrics work and press against the plungers or rods, which are thereby pushed outward, as required, at right angles with the shaft into or near the hereinbefore-described boxes or frames $e$ $e$, and give the pressure required and act upon other rods and levers and perform the operations required. Fig. 3 represents a section of the shaft $b$ with one set of the said cams or eccentrics, and showing the relative positions thereof on the shaft.

The pressure for pressing or consolidating the clay or other substance from which the article is to be manufactured, when the said substance has entered the inner boxes, $f$, through vertical openings $a'$ $a'$ in the same, is effected by means of the cams or eccentrics $l$, attached to the shaft $b$ immediately between the boxes or frames $e$ $e$, so that when the shaft revolves, the cams or eccentrics $l$ will work and press against the plungers $h$, which are thereby pushed out horizontally into the hereinbefore-described inner boxes, $f$, and the plungers $h$ will press the material that is within the boxes $f$ into the shape required between themselves and the plungers $g$, which at this time will have moved with the plungers $h$ into their farthest outward position, and will also give the clay or the like the required density. When the cams $l$ have revolved past the plungers $h$, the latter are returned to their former position by the action of springs, one of which is shown at $m$, Fig. 1, attached to studs $n$ above and below the plungers and to studs $o$ on the box $f$ of the machine. The pressed bricks, tiles, or the like are then pushed back over the vertical openings $a'$ $a'$ by the action of the second set of cams or eccentrics, $p$, arranged on the shaft $b$. The said cams or eccentrics $p$ operate rods $q$ and levers $r$, working on hinges or joints $s$, which levers move forward the second set of plungers, $g$ $g$. The levers $r$ have slotted holes in their hinges or joints, to allow of play or lateral motion where required. Small cams $t$ $t$ serve to move the plungers $g$ by means of rods $u$ and the levers $r^2$, (pivoted at $r^3$ and provided with slotted holes in their joints,) so as to be clear of the hereinafter-described lifting-plungers when they rise. The pressed bricks, tiles, or the like are then lifted to the required level by the action of another cam or eccentric, $w$, on the shaft $b$, which cam or eccentric, by means of a rod or plunger, $y$, operates levers $x$, working underneath the boxes or frames $e$ $e$, the ends of which levers $x$ work with slotted joints or through holes in the pressing-down plunger $y$ or lifting-plungers $z$ $z$, to allow of the advancing and withdrawing motions of the levers $x$.

$g^3$ $g^3$ are guides for steadying the plungers $z$ as they rise and descend. By this means the plungers $z$ $z$ are caused to lift the articles pressed to the level of the top of the frame $e$, from whence the articles can then be removed by hand; or, as in the case of articles pressed or molded from powdered clay, they can, as shown, be pushed aside by the hereinafter-described movable mouth-pieces $b'$ of the hopper $c'$, which also serve to feed the machine with the material to be pressed or molded. The plungers $g$ are moved back in the inner boxes as the plunger $h$ advances by means of the cams $d'$ acting on the rods $u$ and levers $r^2$.

$b^2$ $b^2$ are shearing-plates serving to support the pressure of the plungers $g$, and which are intended to shear in case of undue pressure; or other suitable means can be employed for this purpose. The mouths $b'$ of the hopper $c'$ are moved backward and forward by means of cams or eccentrics $e'$ $e'$ on the shaft $b$ revolving just outside the frames or boxes $e$. One part, $e^2$, of the said cams or eccentrics $e'$, pressing upon levers $f'$, connected by rods $g'$ with the mouths $b'$ of the hopper $c'$, pushes the mouths over the vertical openings $a'$, in which work the plungers $z$, while the latter are level with the top of the boxes $e$. The mouths $b'$ thus perform the several operations of pushing off the pressed or molded articles that have been lifted up from the boxes $e$ by the plungers $z$ and compressing the clay or other material within the said mouth-pieces, as will be hereinafter described. The other part of the cams or eccentrics $e'$ is formed, as shown at $e^3$, to allow the levers $f'$ and rods $g'$ to be pulled by the action of levers $h'$ with weights $i'$, and to move back sufficiently to widen the mouth-pieces $b'$ of the hopper $c'$, one side of the mouth-pieces being removable to a certain distance for this purpose, as hereinafter described. The partially-compressed clay or other material is thereby allowed to descend on the plungers $z$ into the inner boxes, $f$, to be still further compressed by the action of the cams or eccentrics $l$. The cams or eccentrics $e'$ then allow the levers $f'$ and rods $g'$ to move still farther, so that the mouth-pieces $b'$ of the hopper $c'$ are pulled (by the weight $i'$ acting on the lever $h'$, keyed on a stud, $j'$) back against lugs or projections $b^3$ and $c^3$ on the hopper $c'$ and frames $e$, respectively, and clear of the openings $a'$, in which the lifting-plungers $z$ work, to be again filled with powdered clay or other material through the feed-orifices $k'$ in the hopper $c'$ above. The projections $b^3$ and $c^3$ serve to give the hopper a shake, in order to cause the material to drop therefrom into the mouth-pieces below.

The mouth-pieces $b'$ of the hoppers are constructed in halves $m'$ and $n'$, as shown in end and side views at Figs. 4 and 5, respectively, which can be pressed together flatwise, the size of the spaces between them for the powdered clay or other material being regulated by set-screws $l'$, working in lugs $a^3$ on the halves $m'$ and passing loosely through the other halves, $n'$, which screws, when the pressing sides or halves are withdrawn, allow the said spaces in the mouth-pieces to become enlarged to the extent allowed by the pins $l'$, the contents being then released.

By means of the set-screws $l'$ the mouth-pieces can be adjusted so that the upper part shall contain a greater thickness of clay or other material than the bottom part, to compensate for the clay, dust, or other material when dropped from the hopper being more dense at the bottom of the mouth-pieces than at the top.

$c^2$ $c^2$ are brackets on the boxes or frames $e$, serving as stops for the mouth-pieces $b'$, to allow of the material being pressed therein, projections $d^3$ being formed on the mouth-pieces to meet the said brackets.

The short sides $o'$ of the mouth-pieces $b'$, at right angles with the pressing sides $m'$ and $n'$, are slightly wider apart at the bottom than the top, as shown in dotted lines in Fig. 4, so as to offer no obstruction to the partially-compressed clay, dust, or other material being released and descending on the lifting-plungers $z$, to be further compressed within the inner boxes, $f$, by the action of the plungers $h$ and cams or eccentrics $l$, as hereinbefore described.

$e^3$ shows one of two projections on the boxes or frames $e$, for the purpose of giving the side $n'$ of the mouth-pieces $b'$ a slight jerk to insure the partly-pressed material leaving the faces of the mouth-pieces when the latter are opened.

$f^3$ represents dovetail grooves in the plungers $z$, in which grooves wire scrapers or oiled material can be inserted when required to clean or lubricate the face $i$ of the plungers $g$.

The plungers $z$ are made heavy, in order to insure them descending when the cam $w$ leaves the plunger $y$; or I sometimes attach a weight to the plungers $z$, or lift up the plunger $y$ by the action of a lever worked from one of the cams $e'$.

$p'\,p'$ are the beams to which the boxes or frames $e$ are bolted.

$q'\,q'$ are brick or stone supports for the bearings $d$ of the shaft $b$.

The operation of the machine is as follows: The hopper $c'$ being supplied with the material to be pressed and molded and the mouth-pieces $b'$ being under the openings $k'$ and having been filled with the material to be pressed, the shaft $b$ and fly-wheel $a$ are set in motion by any desired means. The cam $w$ will lift the plungers $z$ with their tops level with the tops of the boxes $e$, and will keep them in that position while the mouth-pieces $b'$ of the hopper are pushed over the plungers $z$ by their cams $e'$ and rods $g'$ and levers $f'$, which at the same time press the mouth-pieces between the rods $g'$ and the brackets $c^2$. Then, by the further action of the cams $e'$ and weights $i'$, the sides $n'$ of the mouth-pieces are slightly withdrawn, thereby allowing the partly-pressed contents of the mouth-pieces $b'$ to rest on the plungers $z$, which now descend (the cam $w$ passing away from the plunger $y$) and carry with them the partly-pressed material into the inner boxes, $f$. The cams $l$ now commence to actuate the plungers $h$, thereby pushing along the partly-pressed clay, dust, or other material in the inner boxes, $f$, where it is compressed between the two sets of plungers $h$ and $g$, the plungers $g$ resting with their back faces against the shearing-plates $b^2$ in the boxes or frames $e$. As soon as the cams $l$ have passed by the plungers $h$, the cams $p$ commence to act upon the rods $q$, which, through the levers $r$, working on the hinges or joints $s$, propel the plungers $g$, thereby causing them to move the article pressed into a line with the openings $a'$. The small cams $t$ then cause the plungers $g$ to withdraw slightly into the inner boxes, $f$, when the cam $w$ will, by means of the levers $x$, cause the plungers $z$ to lift the pressed articles to the level of the top of the boxes $e$, and, while the said cams hold the plungers in their raised position, the cams $e'$ will push the mouth-pieces $b'$ over the plungers $z$, thereby pushing away the pressed articles, the said mouth-pieces being then ready to be again filled from the hopper $c'$, and so on.

Although I have described the mouth-pieces $b'$ as being formed in two parts, in some cases, as when pressing partly-dried molded clay, I can construct the mouth-pieces in one piece, as will be well understood.

I sometimes form the plungers and inner boxes with spaces or passages for the purpose of admitting steam or hot air, so as to warm the same, thereby preventing the clay or other material from adhering as much as it would otherwise do.

It will be obvious that the number of the boxes or presses on each side of the shaft or on each side of the fly-wheel can be increased according to requirements or to the strength of the motive power or machinery.

I sometimes work the machine without the hereinbefore-described hoppers and mouth-pieces, and in that case I fill in the material to be pressed and remove the same, when pressed, by hand or by other suitable means.

Having now particularly described the nature of my said invention and in what manner the same is to be used, what I claim is—

1. In a machine for pressing and molding bricks, tiles, and the like, the combination, with a single central horizontal shaft, $a$, having thereon a fly-wheel adapted for continuous revolution during the working of the machine, a series of cams or eccentrics, $l$, $p$, $e'$, $d'$, $t$, and $w$, on said shaft, arranged substantially as set forth, and performing the several duties of operating the plungers, pushing the mouths of the hopper over the vertical openings in the boxes, lifting the pressed articles to the level of the top of the frame, and moving back the plungers, all substantially as shown and described.

2. In a machine for molding bricks, tiles, &c., having a single central horizontal shaft carrying a fly-wheel for continuous revolution while the machine is working, and having thereon a series of cams or eccentrics which impart all the requisite motions to the machine, two or more boxes or frames, $e$, bolted or firmly attached to one another and placed on opposite sides of said fly-wheel and cam-shaft, the combination being and operating substantially as and for the purpose set forth.

REGINALD STANLEY.

Witnesses:
G. F. REDFERN,
A. ALBUTT.